July 28, 1942.  A. D. ANDREEF  2,291,440

TENNIS RACKET MOLDING MACHINE

Filed April 12, 1940

INVENTOR
ALEXIS. D. ANDREEF
BY Fetherstonhaugh &Co.
ATTORNEYS

Patented July 28, 1942

2,291,440

UNITED STATES PATENT OFFICE 2,291,440

TENNIS RACKET MOLDING MACHINE

Alexis D. Andreef, Montreal, Quebec, Canada

Application April 12, 1940, Serial No. 329,229

4 Claims. (Cl. 144—259)

This invention relates to molding apparatus for use in the manufacture of tennis, squash and other rackets and the object is to provide an apparatus whereby the molding of the frame and handle portions of the racket and the gluing thereof to the hollow and heart pieces may be accomplished in a single operation.

Proceeding now to a more detailed description reference will be had to the accompanying drawing, wherein—

Figures 1, 3:
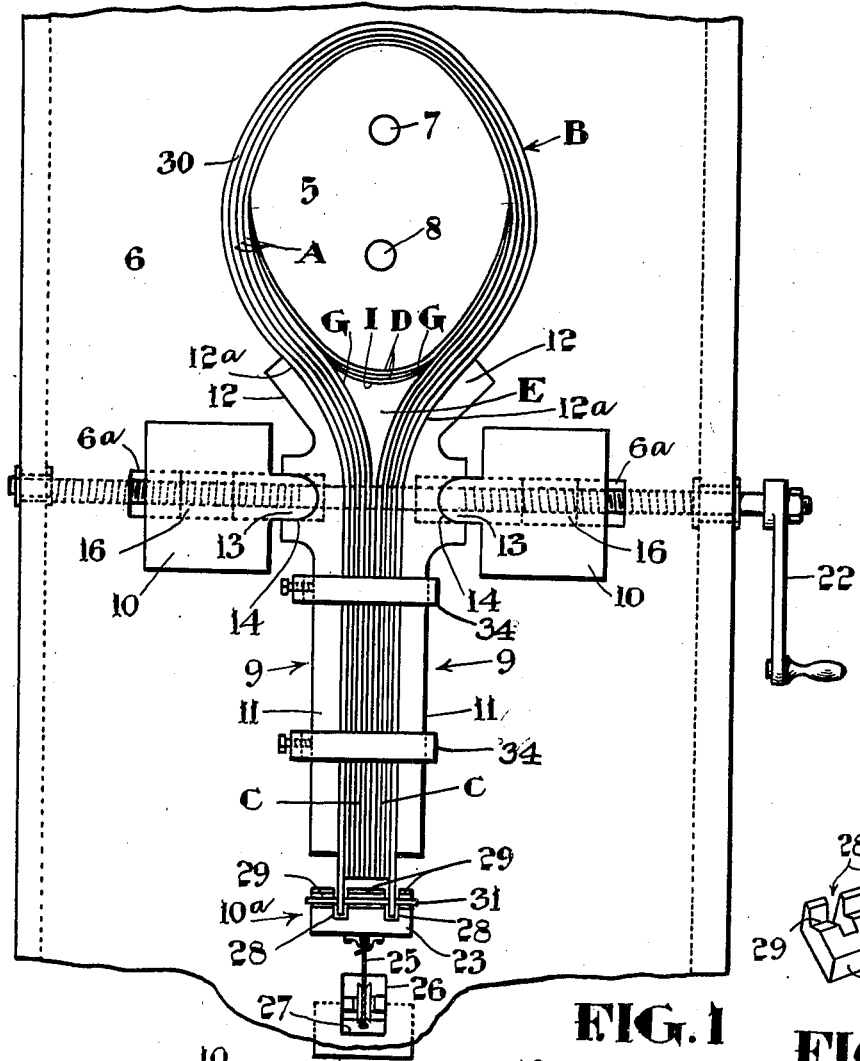
Fig. 1 is a plan view of my improved apparatus.
Fig. 3 is a perspective view of the weight operated block shown in Fig. 1.
Figure 2:
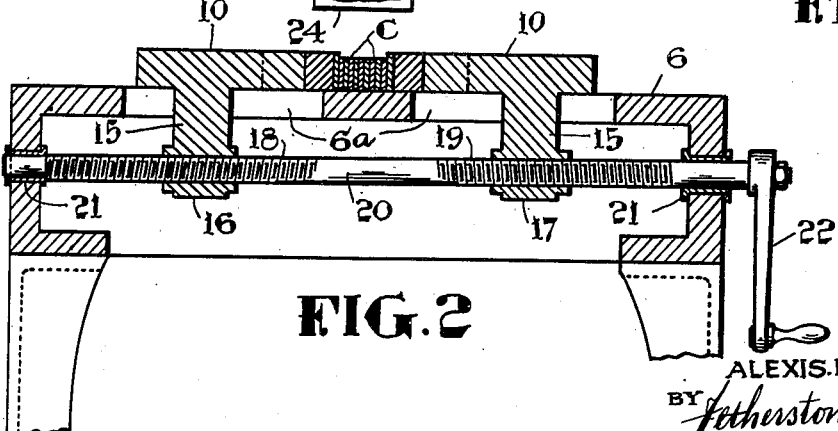
Fig. 2 is a transverse sectional view taken along the line 2—2 of Fig. 1.

Referring more particularly to the drawing, 5 designates a frame molding form positioned on the work-table 6 by positioning pins 7 and 8. This form is used in conjunction with the side molding plates 9, the pressure applying clamps 10, and the tensioning device 10a. The plates 9 are arranged on table 6 between the clamps 10 and are provided with straight portions 11 and curved portions 12. The clamps 10 are provided with spherically curved nose portions 13 which bear against spherically curved seats 14 provided at the outer sides of the molding plates 9 adjacent the curved portions 12. The clamps 10 are also provided with depending portions 15 working in transversely extending slots 6a provided in the table 6. At their lower ends the depending clamp portions 15 are provided with nuts 16 and 17 in threaded engagement with oppositely threaded portions 18 and 19 of a screw shaft 20 which is journalled in suitable bearings 21 and is provided at one end with an operating crank 22. When shaft 20 is turned in one direction the clamps 10 are moved toward each other to apply clamping pressure to the molding plates 9. When the shaft 20 is turned in the opposite direction the clamps 10 are moved away from each other to relieve the clamping pressure on the plates 9.

The tensioning device 10a comprises a weight operated block 23 which is slidably mounted on the table 6. This block is connected to a weight 24 by means of a cable 25 passing over a pulley 26. The weight 24 may be arranged beneath the table with the cable 25 passing through the table slot 27. That side of block 23 which faces the frame molding form 5 is provided with two laterally spaced slots 28 intersecting V-shaped grooves 29 formed in the upper surfaces of the portions of the block lying between and at opposite sides of the slots.

In using the apparatus described herein a flexible metal ribbon 30 is assembled with one side of a previously prepared strip A of laminated wood and this assembly is then bent around the form 5 as shown in Fig. 1 to form the frame portion B and the handle portion C, the latter being disposed between the side molding plates 9. The hollow and heart pieces D and E are arranged in place in the conventional manner and the free ends of ribbon 30 are secured in the slots 28 of block 23 by a fastening pin 31 which is seated in the grooves 29 of the block and passes through openings of ribbon 30 which are disposed in alignment with said grooves. The weight 24, acting through the block 23, exerts a pull on the free ends of the ribbon 30 and serves to draw the form encircling portions of the ribbon and the laminated strip A against the frame molding form 5.

During the molding operation hereinafter described the racket parts B, C, D and E are glued together in their proper relation to each other, the handle portions C being glued to each other and being also glued to the curved side edges G of the heart piece H which, in turn, is glued along the line I to the hollow D. It may be noted here that the curved surfaces 12a provided at the inner sides of the curved portions 12 of the molding plates 9 should be parallel with curved side edges of the heart piece E. After the ends of the metal ribbon have been fastened to the tension applying block 23, the molding plates 9 are forced together under considerable pressure by the screw operated clamps 10. Owing to the length of the clamping plates 9 and the spherical bearing surfaces 13 and 14 provided between these plates and the clamps 10, the pressure of plates 9 against the interposed frame and handle portions of the racket will be uniformly distributed along the full length of the handle portion C of the racket. Since the curved surfaces 12a of plates 9 are parallel with the curved side edges G of the heart piece E, it will also be seen that the portions of the laminated strip A lying against the curved side edges G of the heart piece will be pressed thereagainst with sufficient pressure to ensure that these parts will become firmly glued during the pressing operation. The curved surfaces 12a of the plates 9 also ensure that the laminated strip A and the heart piece E will the properly pressed against the contacting portions of the hollow D. The tension exerted on the metal ribbon 30 by the weighted block 23 during these pressing operations ensures proper molding of the racket parts about the molding form 5. Upon completion of the pressing operations described herein the plates 9 and the parts interposed therebetween are temporarily tied together by the application of suitable holding clamps 34. The clamps 10 are then backed off by operation of the screw shaft 20 and the clamped together assembly, including the plates 9 and the interposed racket, are removed from the table 6 and set aside until the glue binding the component elements of the racket is dried and set. Another pair of molding plates 9 is substituted for the ones removed from the table 6 and the operations described herein are repeated in connection with the molding of another racket frame.

While I have described what I now consider to be the preferred embodiment of this invention it will be understood that various modifications may be resorted to within the scope and spirit of the invention as defined by the appended claims. It may be pointed out, for example, that the weight attached to the block 23 may be replaced by a spring or other equivalent means for exerting a pull on the ends of the metal ribbon 30.

Having thus described my invention, what I claim is:

1. Apparatus of the character described comprising a table, a form on said table around which a strip of material is bent to form the frame, throat and handle portions of a tennis or similar racket, a pair of side molding plates arranged on said table and adapted to be forced together to apply molding pressure to the throat and handle forming portions of said strip, the inner pressure applying side of each plate being shaped to provide a relatively short convexly curved throat pressing surface merging with a relatively long, straight handle pressing surface, the length of the latter being substantially equal to the desired length of the handle portion of the racket to be formed, the outer side of each plate being recessed to provide a spherically curved seat in close proximity to the point where the curved throat pressing surface of the plate merges with the straight handle pressing surface, a block mounted on the table opposite the outer side of each plate so as to be capable of sliding movement in the lateral direction of the plate, said block being provided with an integral spherically curved pressure applying projection fitting in the spherically curved seat of the plate and means for forcing said blocks together to press the plates against the interposed throat and handle forming portions of said strip.

2. Apparatus for use in the manufacture of tennis rackets comprising a table on which is arranged a form about which a strip of suitable material is bent to provide the frame, throat and handle portions of the racket, a pair of side molding plates between which the throat and handle forming portions of the strip are subjected to molding pressure after the strip has been bent around the form, the inner side of each plate being shaped to provide a relatively short convexly curved throat pressing surface extending inwardly from the end of the plate which is closest to the form and merging, at its inner end, with a relatively long and straight handle pressing surface extending to the opposite end of the plate, a pair of pressure applying clamps arranged on said table so that each clamp is opposed to the outer side of one of said plates, each of said clamps being provided with a convexly curved pressure applying surface engaging a concavely curved seat provided at the outer side of one of said plates close to the point where the throat and handle pressing surfaces of the plates merge together, projections from said clamps extending downwardly through openings in said table and a rotatably mounted screw shaft extending transversely beneath the table and in threaded engagement with said projections.

3. Apparatus for use in the manufacture of tennis or other rackets comprising a form about which a strip of suitable material is bent to provide the frame and handle portions of the racket, molding members adapted to be pressed against opposite sides of the handle forming portions of said strip after the latter has been bent around the form, a flexible metal ribbon adapted to be bent around the form with said strip so that the metal ribbon lies between said strip and the pressure applying surfaces of the molding members, a slidably mounted ribbon tensioning block, means for detachably securing both ends of the ribbon to said block, a pulley, a flexible element trained around said pulley and having one end secured to said block and a weight attached to the other end of said element.

4. Apparatus for use in the manufacture of tennis or other rackets comprising a form about which a strip of suitable material is bent to provide the frame and handle portions of the racket, molding members adapted to be pressed against opposite sides of the handle forming portion of said strip after the latter has been bent around the form, a flexible metal ribbon adapted to be bent around the form with said strip so that the metal ribbon lies between said strip and the pressure applying surfaces of the molding members, a freely movable block provided with slots in which the two ends of the ribbon are inserted after the latter has been bent around the form, means for securing the ends of the ribbon in said slots comprising a pin passing through openings in the said ends of the ribbon and having portions thereof fitted in grooves intersecting said slots and means connected to said block and exerting a pull thereon in a ribbon tensioning direction.

ALEXIS D. ANDREEF.